US005161727A

United States Patent [19]

Leturmy et al.

[11] Patent Number: 5,161,727

[45] Date of Patent: Nov. 10, 1992

[54] DEVICE FOR PROVIDING A NON-OXIDIZING ATMOSPHERE ABOVE A SOLDERING BATH OF A MACHINE FOR WAVE SOLDERING

[75] Inventors: Marc Leturmy, Trappes; Denis Fumat, Versailles; Sylvie Mellul, L'Haye les Roses; Michel Verlhac, Chatillon, all of France

[73] Assignee: L'Air Liquide, Societe Anonyme pour l'Etude et l'Exploitation des Procedes Georges Claude, Paris, France

[21] Appl. No.: 804,717

[22] Filed: Dec. 12, 1991

[30] Foreign Application Priority Data

Dec. 20, 1990 [FR] France .............................. 90 15994

[51] Int. Cl.[5] .............................................. B23K 3/00

[52] U.S. Cl. ........................................ 228/37; 228/42

[58] Field of Search .................. 228/37, 42, 43, 180.1, 228/219

[56] References Cited

U.S. PATENT DOCUMENTS 4,921,156 5/1990 Hohnerlein .......................... 228/42
5,044,542 9/1991 Deambrosio ......................... 228/42
5,048,746 9/1991 Elliott et al. ........................ 228/37

FOREIGN PATENT DOCUMENTS 0211563 2/1987 European Pat. Off. .
3813931 11/1989 Fed. Rep. of Germany .

OTHER PUBLICATIONS

Patent Abstract of Japan, 63-174778, "Automatic Soldering Method and its Device", vol. 12, No. 442 (M-766) [3289] Nov. 21, 1988.

*Primary Examiner*—Samuel M. Heinrich
*Attorney, Agent, or Firm*—Young & Thompson

[57] ABSTRACT

A device for providing a non-oxidizing atmosphere above a soldering bath in a vat of a machine for wave soldering, includes a hooding assembly closing the vat, an inner space and a conveyor for electronic circuits extending through the inner space. The inner space is separated from the surrounding atmosphere through seals disposed along the path of the circuits. There is structure for providing and maintaining a non-oxidizing atmosphere in the inner space, for example an inert gas or a mixture of inert and reducing gas.

19 Claims, 2 Drawing Sheets

DEVICE FOR PROVIDING A NON-OXIDIZING ATMOSPHERE ABOVE A SOLDERING BATH OF A MACHINE FOR WAVE SOLDERING

BACKGROUND OF INVENTION (a) Field of the Invention

The present invention concerns a device for providing inertness to the soldering bath of a machine for wave soldering, of the type comprising a vat containing a soldering bath and means for conveying electronic circuitries along a path which extends in the vicinity of the surface of the bath.

(b) Description of Prior Art

Wave soldering machines are used for brazing electronic components on circuitries or for the pre-tinning of electronic components. The components intended to be brazed or tinned are contacted, along the path, with one or more waves of liquid soldering material obtained by pumping, through a nozzle, the bath of soldering material contained in the vat.

One of the major problems encountered during the utilization of these wave soldering machines is the oxidation of the bath of liquid soldering material which is normally exposed to air. This oxidation produces a layer of oxide at the surface of the bath, which is always broken by the movements of the bath, thereby continuously exposing a new surface of soldering material to oxidation. In order not to disturb the wetting of the metallic surfaces of the components with the material, the bath of soldering material should be regularly cleaned in order to remove slag therefrom. This continuous formation of slag increases the cost of utilization of the machine (powder consumption, maintenance cost) and represents on the other hand a danger for the environment when metals which are present in the bath, and the corresponding oxides, such as lead, are toxic.

In order to overcome this problem of slag, it has been proposed to cover the surface of the bath of soldering material with oil. This film of oil provides a true protection of the bath against oxidation but, on the other hand, causes problems which result from the degradation of oil, which should be changed on a regular basis, the difficulty of removing the quantities of oil accumulated on the components or the circuitries, or also the production of fumes.

It was also proposed to enclose the soldering machine in a sealed enclosure which contains an inert atmosphere, however this solution has been found to be complicated due to the fact that the soldering machine is placed in a production line including, upstream of the wave welding station, a fluxing station, for the application of flux on the metallic parts of the components in order to facilitate wetting with the soldering material, followed by a preheating to dry and activate the flux and reduce the thermic shock during contact with the wave, and, downstream, a cooling station to rapidly solidify the soldering material and prevent an overheating of the components, so that these different stations should be integrated in the sealed enclosure.

SUMMARY OF INVENTION

It is an object of the present invention to propose a device for providing a non-oxidizing atmosphere which is simple and efficient, economical to manufacture, and which can be adopted without specific conversion on most of the existing wave soldering lines.

To achieve this, according to a characteristic of the invention, the device includes a substantially closed hooding assembly including at least one upstream structure and one central structure disposed above the vat, and means for providing and maintaining a non oxidizing atmosphere in the hooding assembly and directly above the bath, characterized in that the central structure includes a lower part which cooperates in a substantially impervious manner with the vat and in that at least the central structure comprises an upper part in the form of a hood in which an inlet gas channel opens and including a diffuser extending above the conveying means.

This arrangement enables substantially reducing the oxidation of the soldering bath, decreasing down-time and improving the performance of the line, for example, as a result of the continuity between the front and central structures, substantially reducing the thermic shock of the components which come into contact with the wave, and reducing the emanations of metals or toxic oxides.

BRIEF DESCRIPTION OF DRAWINGS

Other characteristics and advantages of the present invention will appear from the description which follows of embodiments given by way of illustration but without limitation, with reference to the annexed drawings, in which.

DESCRIPTION OF PREFERRED EMBODIMENTS

Figure 1:
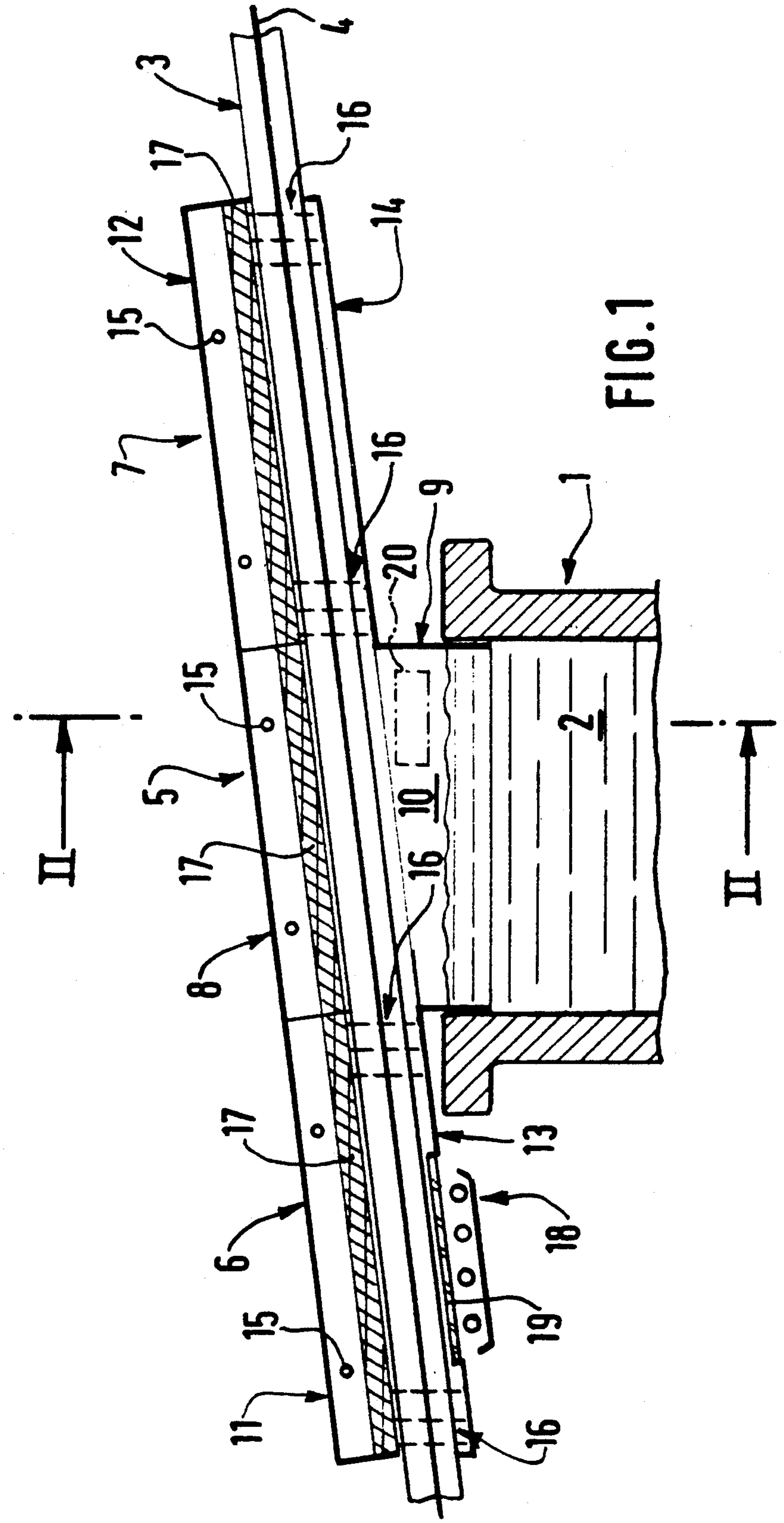
FIG. 1 is a longitudinal cross-section view of a device for providing a non-oxidizing atmosphere above a soldering bath of a machine for wave soldering according to the invention.

In the description which follows and in the drawings, the same or similar elements are identified by the same reference numerals.

Figure 2:
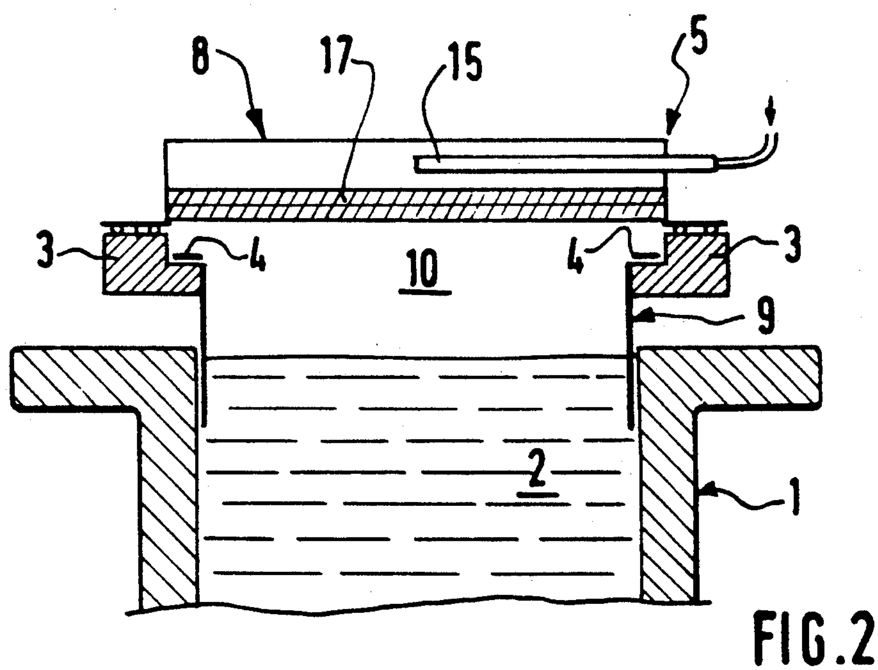
FIG. 2 is a schematic view in cross-section according to line II—II of FIG. 1.

In FIGS. 1 and 2, there is shown a heat-insulated vat 1 containing a bath of soldering material 2 and provided with means (not illustrated) for producing, at the surface of the bath, waves which will lick electronic circuitries which move above bath 2 through conveying means comprising, in the example illustrated, a pair of rails 3 each supporting a transfer belt 4 on which are disposed frames which support the circuitries.

According to the invention, a hooding assembly comprising (FIG. 1) a central structural member 5 disposed directly above the vat 1, and typically a front structural member 6, disposed upstream of the vat 1 in the direction of circulation of the circuitries, and a rear structural member 7 disposed downstream of the vat 1, is associated with the conveying means 3, 4. The central structural member 5 includes an upper part in the form of a hood 8 which is imperviously mounted on the two rails 3 while bridging said rails, and a lower part 9, in the form of a skirt, whose transverse cross-section corresponds to the internal transverse cross-section of the vat 1, which is received in a substantially impervious manner in vat 1, by being immersed in the bath 2, wherein an upper portion is inserted between the opposite faces of the two rails 3. The central structural member 5 thus defines, directly above the bath 2, an inner space 10 through which pass the conveying means 3, 4, and which insulates the surface of the bath 2 from the surrounding atmosphere.

The front and rear structural members 6 and 7 similarly include an upper hooding 11, 12, respectively, mounted on rails 3 and being continuously connected to the upper hood 8 of the central structural member 5, and lower hoodings 13, 14, respectively mounted between the rails 3 and being continuously connected to skirt 9.

Ducts 15 which are connected to a source of non-oxidizing gas, typically an inert gas, such as nitrogen or argon, or a reducing mixture of such an inert and reducing gas such as hydrogen, opens into the upper hoodings 8, 11, 12, to permit an optimization of the ulterior steps of fluxing and cleaning. In order that the interior of the hooding assembly be impervious towards the surrounding atmosphere, the front and rear structural members 6 and 7 are each provided, at their inlet and their outlet, with a series of flexible screens 16 which hang from the upper hoodings 11, 8, 12, and between the rails 3. Typically, each screen 16 consists of a double series of flexible lamella sheets, for example of silicone, the lamella sheets of one series being transversely offset with respect to the lamella sheets of the other series. To promote a lamellar flow of the protecting gas through the structural members 5, 6 and 7, the upper hoodings 11, 8, 12 include a diffuser structure 17, of generally planar configuration, immediately overhanging the conveying path of the circuitries, by being disposed between the latter and ducts 15.

The front structural member 6, defining an upstream barrier, may be supplied with a hot protection gas, as a replacement for the upstream preheating station. Similarly, the rear structural member 12 may be supplied with a cool protection gas, to be subtituted for the usual downstream cooling station. If the pre-existing upstream preheating station is of the type with infra-red heating by means of tubes of quartz 18, there should then be provided, in the lower hooding 13, a glass 19, which is transparent to infra-red radiations. If the users require that a visual inspection of the waves at the surface of the bath 2 be available, there should optionally be provided, in the central structure 5, a porthole 20.

Figure 3:
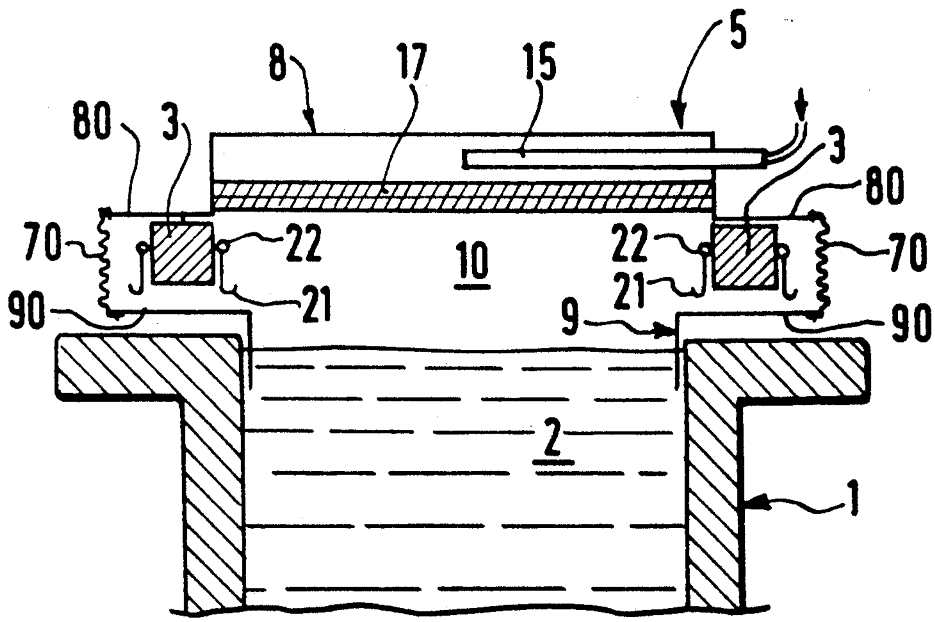
FIG. 3 is a view similar to FIG. 2 but of a variant.

In FIG. 3, a variant has been represented which is adapted for use with means of conveying circuitries of the type wherein the circuits hang from hooks 21 which are supported by a transfer chain 22, the space between the rails 3 being modified according to the dimensions of the circuits to be soldered. In this embodiment, the upper hooding 8 includes, in the upper part thereof, two wings 80, laterally extending to provide for the variations of spacing between the rails, the wings being removably mounted on said rails. The upper hoodings, 8, 11, 12 and the lower hoodings 9, 13, 14 are impreviously and removably interconnected by means of flexible partitions 70, which could for example be metallic, so as to completely enclose the conveying means. For this purpose, the lower part defining skirt 9 of the central structural member 5 also includes, in the upper part thereof, outwardly and laterally extending wings 90, which are mounted opposite wings 80 of the upper hooding 8.

In practice, the length (along the path of the conveying means) of the front and rear structural members 6 and 7 is greater than the length of the electronic circuit boards to be soldered or treated. With such an arrangement, the ranges of renewing rates of inert or reducing atmosphere (ratio of the overall gaseous flow in contact with the enclosure with respect to the inner volume of this enclosure) are the following, for a hooding assembly having an internal volume of the order of 45 $dm^3$ and shorter than twice the length of the circuits:

front structural member 6: 100–750/h
central structural member 5: 50–500/h
rear structural member 7: 0–500/h.

By utilizing nitrogen as the inertness providing gas, the following results are obtained:

7 ppm oxygen measured at the level of the surface of the soldering bath;

weight of residual slag: 20 g/hour (instead of 900 g/h with the bath exposed to ambient air).

Since the leaks of protecting gas take place essentially through the outlet of the rear structural member 7, there may advantageously be provided, in the vicinity of this outlet, a small suction hood for the evacuation and/or the recycling of the gaseous effluents.

Although the present invention has been described with respect to specific embodiments, it is not limited thereby and is capable of modifications and variants which will appear to one skilled in the art.

We claim:

1. Device for providing a non-oxidizing atmosphere above a soldering bath of a wave soldering machine comprising a vat containing a soldering bath, means for conveying electronic circuitries along a path which extends in the vicinity of the surface of the bath and through a substantially closed hooding assembly including at least one upstream structural member and one central structural member which is disposed above the vat, and means for providing and maintaining a non-oxidizing atmosphere in the hooding assembly and directly above the bath, wherein the central structural member includes a lower portion which substantially imperviously cooperates with the vat, at least the central structural member comprises an upper part in the form of a hood in which a gas feeding duct opens and including a diffuser which extends above the conveying means, the conveying means comprise a pair of rails, and the upper part in the form of a hood is imperviously mounted on the rails.

2. Device according to claim 1, wherein the hooding assembly additionally includes a downstream structural member.

3. Device according to claim 2, wherein each structural member of the hooding assembly includes an upper part in the form of hood including a diffuser, at least one gas inlet duct opening in said upper part.

4. Device according to claim 1, wherein each structural member of the hooding assembly includes, at inlet and/or outlet thereof, at least one impervious flexible screen.

5. Device according to claim 1, wherein the lower part of the central structural member is in the form of a skirt, and has a transverse cross-section corresponding to the internal transverse cross-section of the vat.

6. Device according to claim 5, wherein each structural member of said hooding includes flexible means for lateral connection between the upper part in the form of hood and a lower part.

7. Device according to claim 6, wherein the upstream structural member includes heating means.

8. A shield gas apparatus for shielding a solder bath of a wave soldering machine having a vat containing a solder bath, comprising a substantially closed housing assembly including at least one upstream section and a central section arranged above the vat, means for conveying electronic components along a path which extends in the vicinity of an upper surface of the bath and through the housing assembly, the conveying means comprising a pair of rails, each section having a lower part and an upper part, the upper part having the form of a hood sealingly supported on the rails, into which opens at least one duct for supplying a non-oxidizing gas and which includes a gas diffuser extending above the conveying means, the central section having a downwardly open lower part cooperating in a substantially sealed manner with the vat.

9. The apparatus of claim 8, further comprising lateral flexible means interconnecting the upper part and the lower part of each section.

10. The apparatus of claim 9, wherein the flexible means extend laterally outwardly from the rails.

11. The apparatus of claim 8, wherein the diffuser is of a substantially flat configuration and extends between the conveying path and the gas supplying ducts.

12. The apparatus of claim 8, wherein the lower part of the central section is in the form of a skirt having a transverse cross-section substantially mating with the transverse cross-section of the vat.

13. The apparatus of claim 12, wherein the upstream section includes heating means.

14. A modified atmosphere hood assembly for wave soldering an electronic element is a wave soldering machine having a vat containing a solder bath, comprising means for creating a modified atmosphere in at least a first section of the hood assembly arranged in a substantially gas-tight manner above the vat, the first section having an entry and an exit, means for conveying the electronic element along a path extending from the entry to the exit and above the solder bath, retaining means at the entry and at the exit to retain the modified atmosphere in the first section, the first section having a lower part and an upper part including a diffusion wall structure extending above the conveying path and delimiting in the upper part an upper chamber into which extends at least one gas supply duct thereby to diffuse the flow of modified atmosphere into the lower part and above the soldering bath.

15. The hood assembly of claim 14, further comprising a second section prolonging the first section upstream relative to the conveying path and through which extends the conveying means, the second section having an entry provided with gas retaining means and having an upper part with an inner diffusion wall structure forming an upper chamber into which extends at least a gas supply duct.

16. The hood assembly of claim 15, further comprising a third section prolonging the first section downstream relative to the conveying path and through which extend the conveying means, the third section having an exit provided with gas retaining means and having an upper part with an inner diffusion wall structure forming an upper chamber into which extends at least a gas supply duct.

17. The hood assembly of claim 15, wherein the lower part of the second section includes heating means.

18. The hood assembly of claim 15, wherein the conveying means includes a pair of rails and wherein the upper part of at least the first section is sealingly supported on the rails.

19. The hood assembly of claim 16, wherein each gas retaining means includes at least one flexible impervious curtain.

* * * * *